(12) United States Patent
Watkins, Jr. et al.

(10) Patent No.: US 10,066,396 B1
(45) Date of Patent: Sep. 4, 2018

(54) ROOFING COMPOSITE SCORING TOOL AND METHODS OF USE

(71) Applicant: FIRESTONE BUILDING PRODUCTS CO., LLC, Nashville, TN (US)

(72) Inventors: Carl E. Watkins, Jr., Carmel, IN (US); Brian S. Alexander, Westfield, IN (US); Michael J. Hubbard, Murfreesboro, TN (US); Michael J. Mendoza, Nashville, TN (US)

(73) Assignee: Firestone Building Products Co., LLC, Nashville, TN (US)

( * ) Notice: Subject to any disclaimer, the term of this patent is extended or adjusted under 35 U.S.C. 154(b) by 0 days.

(21) Appl. No.: 15/785,725

(22) Filed: Oct. 17, 2017

Related U.S. Application Data

(60) Provisional application No. 62/409,095, filed on Oct. 17, 2016.

(51) Int. Cl.
*E04D 5/14* (2006.01)
*B26B 25/00* (2006.01)
(Continued)

(52) U.S. Cl.
CPC ............ *E04D 5/148* (2013.01); *B26B 25/005* (2013.01); *B26B 27/00* (2013.01); *B32B 7/06* (2013.01);
(Continued)

(58) Field of Classification Search
CPC .. E04D 5/148; E04D 5/10; B43B 7/12; B43B 7/06; B43B 37/12; B43B 38/0004;
(Continued)

(56) References Cited

U.S. PATENT DOCUMENTS 1,990,967 A * 2/1935 Wenzel ................. B26B 25/005
 30/347
2,906,612 A * 9/1959 Anthony ................ B23D 73/00
 428/601

(Continued)

FOREIGN PATENT DOCUMENTS

GB 154429 A * 12/1920 ........... B26B 25/005
GB 547267 A * 8/1942 ............... B26D 9/00

*Primary Examiner* — Jeanette E Chapman
(74) *Attorney, Agent, or Firm* — Brian D. McAlhaney; Arthur M. Reginelli

(57) ABSTRACT

A method of installing a roofing membrane includes providing a membrane including a polymeric body having first and second opposed planar surfaces and a lap edge, a pressure-sensitive adhesive layer disposed on the first planar surface, and a release member removably affixed to the adhesive layer. Then, cutting the release liner while simultaneously scoring the adhesive layer along a line substantially parallel to the lap edge by use of a cutting and scoring tool and said step of cutting and scoring includes contacting the tool to the release liner. Finally, removing the release liner to expose the adhesive layer in the lap area; then applying a high-tensile member to the exposed adhesive layer in the lap area and forcibly removing the high-tensile member to thereby remove the adhesive layer within the lap area; and seaming the membrane composite to an adjacent membrane.

12 Claims, 10 Drawing Sheets

(51) Int. Cl.
*B26B 27/00* (2006.01)
*E04D 5/10* (2006.01)
*B32B 7/06* (2006.01)
*B32B 38/10* (2006.01)
*B32B 38/00* (2006.01)
*B32B 37/12* (2006.01)
*B32B 7/12* (2006.01)

(52) U.S. Cl.
CPC .............. *B32B 7/12* (2013.01); *B32B 37/12* (2013.01); *B32B 38/0004* (2013.01); *B32B 38/10* (2013.01); *E04D 5/10* (2013.01); *B32B 2419/06* (2013.01)

(58) Field of Classification Search
CPC ... B43B 38/10; B43B 2419/06; B26B 25/005; B26B 27/00
See application file for complete search history.

(56) References Cited

U.S. PATENT DOCUMENTS

| | | | | |
|---|---|---|---|---|
| 3,389,463 A * | 6/1968 | Gene Gerek | ......... | G01N 19/04 30/164.9 |
| 3,593,899 A * | 7/1971 | DeTorre | ............... | C03B 33/107 225/2 |
| 3,865,673 A * | 2/1975 | DeTorre | ............... | C03B 33/033 428/43 |
| 4,415,515 A * | 11/1983 | Rosenberg | ............ | B26D 3/085 264/68 |
| 5,417,974 A * | 5/1995 | Sekiyama | ............. | A01N 25/18 424/405 |
| 5,554,376 A * | 9/1996 | Sekiyama | ............. | A01N 25/18 424/404 |
| 5,786,028 A * | 7/1998 | Cantwell | ................ | B05B 12/24 427/282 |
| 6,875,162 B2 * | 4/2005 | Barksdale | .............. | E04D 5/145 492/13 |
| 7,178,306 B2 * | 2/2007 | Fritz | ...................... | E04D 5/142 156/71 |
| 7,232,501 B2 * | 6/2007 | Katoh | ...................... | B32B 7/12 156/270 |
| 7,503,995 B2 * | 3/2009 | Hayasaka | ........... | B29C 63/0013 156/247 |
| 8,232,761 B1 * | 7/2012 | Thivierge | ............. | H01M 10/44 320/101 |
| 8,691,357 B2 * | 4/2014 | Taya | .................. | G11B 7/24024 428/355 AC |
| 2002/0144485 A1 * | 10/2002 | Wagner | ................... | E04D 15/06 52/746.11 |
| 2004/0191508 A1 * | 9/2004 | Hubbard | ................ | E04D 5/12 428/343 |
| 2007/0028732 A1 * | 2/2007 | Morawiec | ............. | B26D 3/166 83/54 |
| 2008/0063821 A1 * | 3/2008 | Galloway | ................ | B32B 7/06 428/35.2 |
| 2009/0208688 A1 * | 8/2009 | Nakayama | ............... | B32B 3/02 428/41.8 |
| 2010/0024955 A1 | 2/2010 | Kalwara et al. | | |
| 2014/0165989 A1 * | 6/2014 | Baro Cabrero | ........ | B28D 1/225 125/23.02 |
| 2016/0258164 A1 * | 9/2016 | Canales | .................... | E04D 5/00 |
| 2017/0197772 A1 * | 7/2017 | Feder | ........................ | A45F 3/16 |
| 2017/0337850 A1 * | 11/2017 | Sargent | ................ | G09F 3/0291 |

\* cited by examiner

ROOFING COMPOSITE SCORING TOOL AND METHODS OF USE

This application claims the benefit of U.S. Provisional Application Ser. No. 62/409,095 filed on Oct. 17, 2016, which is incorporated herein by reference.

FIELD OF THE INVENTION

Embodiments of the present invention relate to a scoring tool for cutting a release member while simultaneously scoring an adhesive layer of a thermoplastic roofing composite. Other embodiments relate to the associated use of a roofing composite scoring tool.

BACKGROUND OF THE INVENTION

Large, flexible polymeric sheets, which are often referred to as membranes or panels, are used in the construction industry to cover flat or low-sloped roofs. These membranes provide protection from the environment particularly in the form of a waterproof barrier. As is known in the art, commercially popular membranes include thermoset membranes such as those including cured EPDM (i.e. ethylene-propylene-diene terpolymer rubber) or thermoplastics such as TPO (i.e. thermoplastic olefins).

These membranes are typically delivered to a construction site in a bundled roll, transferred to the roof, and then unrolled and positioned over the roof surface. The sheets are then secured to the building structure by employing varying techniques such as mechanical fastening, ballasting, and/or adhesively adhering the membrane to a roof substrate. The roof substrate to which the membrane is secured may be one of a variety of materials depending on the installation site and structural concerns. For example, the roof substrate surface may be a concrete, metal, or wood deck, it may include insulation or recover board, and/or it may include an existing membrane.

In addition to securing the membrane to the roof—which mode of attachment primarily seeks to prevent wind uplift—the individual membrane panels, together with flashing and other accessories, are positioned and adjoined to achieve a waterproof barrier on the roof. Typically, the edges of adjoining panels are overlapped, and these overlapped portions are adjoined to one another through a number of methods depending upon the membrane materials and exterior conditions. For example, a seam can be prepared by applying a liquid adhesive or a solid tape. Or, where the membranes are thermoplastic, a seam can be formed by heat welding adjacent overlapping membranes.

Where the membranes are adhesively secured to a roof substrate, several modes of adhesive attachment are known. One attractive mode includes the use of a pre-applied (i.e. factory-applied) adhesive, which may be covered by a release member, that is applied to the surface of the membrane. These membranes, which are commonly referred to as peel-and-stick membranes, may employ a variety of adhesive compositions, including those applied as a hot melt, including styrene-ethylene-butylene-styrene (SEES), butyl-based adhesives, EPDM-based adhesives, acrylic adhesives, styrene-butadiene adhesives, polyisobutylene adhesives, and ethylene vinyl acetate adhesives.

While peel-and-stick membranes have been used commercially, attempts to use the factory-applied adhesive for seaming adjacent membranes to one another is problematic. The seams between membranes are exposed to conditions not typically present under the membrane (i.e. where the membrane is attached to the underlying substrate), and it is believed that these factors lead to the failure of seams formed using the same pressure-sensitive adhesives used to secure the membrane to the roof surface. For example, as disclosed in U.S. Publ. No. 2004/0191508, it is believed that temperature swings and moisture contributes to the premature failure of these seams. As a result, thermoplastic peel-and-stick membranes are often manufactured with an "open lap region" (i.e. a lap area without an adhesive layer), along the lap edge, so that the seams of these thermoplastic membranes can be heat welded. Alternatively, as disclosed in U.S. Publ. No. 2010/0024955, adhesive tapes (such as butyl-based adhesive tapes) are factory-applied along the lap edge in lieu of the pressure-sensitive adhesive applied to the remainder of the membrane. It has also been proposed, although with limited success, to factory prime the upper surface of the adjoining membrane in an attempt to improve the seam.

Nonetheless, when peel-and-stick membranes are installed, the prevailing preference is to heat seam adjacent membranes while allowing the factory-applied adhesive to secure the membrane to the roof surface. As suggested above, this can be achieved where an "open lap region" is provided during manufacture of the composite. There are, however, difficulties encountered even where an "open lap region" is provided. For example, an "open lap region" is only useful where a full-width sheet is employed. In those situations where the width of the sheet must be altered, the factory-fabricated "open lap region" is lost. These same difficulties can be encountered where the length of the roofing composite is altered during installation.

In order to alleviate these problems, some contractors have found it useful to remove the adhesive layer within the lap region during installation. This has been accomplished by mating a high-tensile member (such as a fabric-backed adhesive tape) to the adhesive layer within the lap region, and then forcefully removing the high-tensile member to thereby remove the underlying adhesive layer. In order to accomplish this procedure, the release member must be removed in the lap region. Accordingly, contractors have found it useful to cut the release member along the lap region and subsequently remove a portion of the release member. Problems have also been encountered because the forceful removal of the high-tensile member can also cause removal of the adhesive layer in an area outside of the lap region. This is believed to be caused by the adhesive having higher internal strength relative to the bond strength to the membrane, and therefore the removal of the adhesive takes place lateral to where the high-tensile member is mated to the adhesive. As the skilled person will appreciate, where the adhesive layer is unnecessarily removed from the non-lap portions of the membrane, the ability to adequately secure the membrane to the roof surface can be compromised. Another problem that can be encountered is damage to the membrane while cutting the release member. Specifically, contractors have found it useful to cut the release member with a construction knife, and therefore the depth to which the blade of the knife is inserted into the adhesive layer and potentially into the membrane is subject to contractor skill. Since the thickness of the adhesive layer is typically less than 1,000 µm, great demands are placed on the contractor to avoid cutting the membrane.

SUMMARY OF THE INVENTION

One or more embodiments of the present invention provide a method of installing a roofing composite membrane, the method includes providing a membrane composite including a polymeric planar body having first and second opposed planar surfaces and a lap edge. The membrane also includes a pressure-sensitive adhesive layer disposed on the first planar surface, and a lap edge wherein a release member is removably affixed to the adhesive layer. The next step includes cutting the release liner while simultaneously scoring the adhesive layer along a line substantially parallel to the lap edge. The step of scoring creates a score line in the adhesive layer, and the score line in the lap edge defines a lap area on the first planar surface, where the step of cutting and simultaneously scoring takes place by use of a cutting and scoring tool that includes a cutting element and a liner-contacting member. The step of cutting and scoring also includes contacting the liner-contacting member to the release liner and then removing the release liner to expose the adhesive layer in the lap area. Next a high-tensile member is applied to the adhesive layer in the lap area and the high-tensile member is then forcibly removed to thereby remove the adhesive layer within the lap area. Finally the membrane composite is seamed to an adjacent membrane.

DETAILED DESCRIPTION OF ILLUSTRATIVE EMBODIMENTS

Embodiments of the invention are based, at least in part, on a scoring tool that can be used to score a factory-applied adhesive layer of a peel-and-stick membrane composite. In certain embodiments, the tool can simultaneously cut a release member while scoring the adhesive layer. The tool, and associated methods, facilitates seaming of peel-and-stick thermoplastic membranes. Specifically, the devices of the invention allow for simultaneous cutting of the release member while scoring the underlying adhesive layer, which subsequently allows removal of the release member covering the lap region of the membrane composite, as well as the subsequent removal of the underlying adhesive layer from the lap edge of the composite to a score line created by the cutting and scoring tool. The cutting and scoring tools of the present invention advantageously regulate the depth to which the blade penetrates the composite to thereby ensure that the blade cuts the release member, scores the adhesive layer, and does not deleteriously penetrate into the thermoplastic membrane. Thus, while current practice may serve to cut the release member and simultaneously score the adhesive layer, the tools of the present invention regulate blade depth and thereby achieve results that cannot be easily achieved by using conventional knives such as a carpenter's knife. In other embodiments, the tool can be used as a guide to accurately tear the release member along a line of demarcation where the tool imparts a score line to the adhesive.

Cutting and Scoring Tool

The cutting and scoring tools of one or more embodiments of the present invention include a handle member, a cutting element, and a liner-contacting member that may be rotatable, fixed, or capable of being fixed, relative to the cutting element to thereby regulate and control the depth to which the cutting element penetrates into the composite when the liner-contacting member is placed in contact with the liner of a membrane composite.

Figure 1:
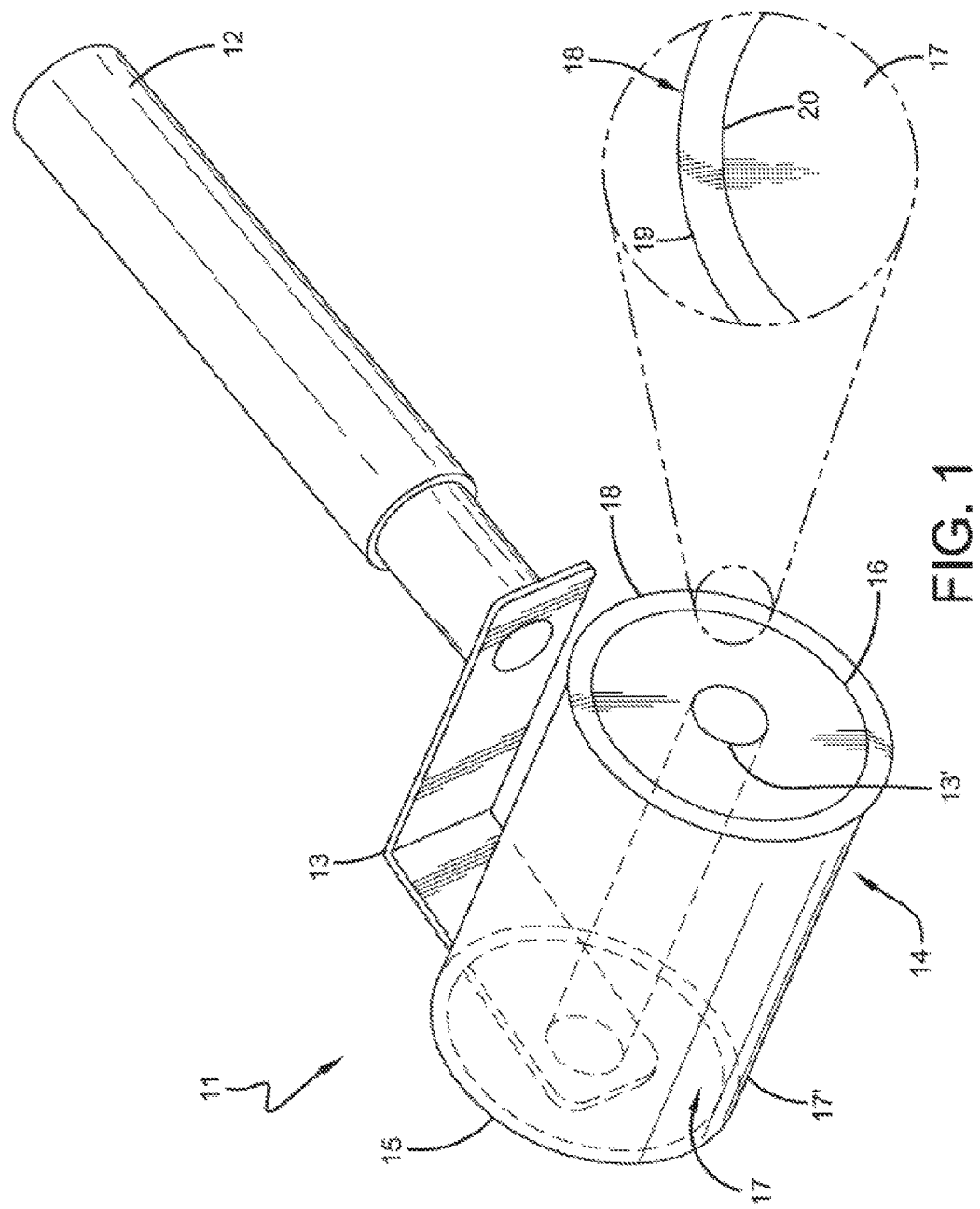
FIG. 1 is a side perspective view, with a detailed view, of one embodiment of a cutting and scoring tool of the present invention.

One embodiment of a cutting and scoring tool according to the present invention can be understood with reference to FIG. 1. Tool 11 includes a handle 12, a release-member contacting element 14, and a cutting element 18. Release-member contacting element 14, which may also be referred to as liner-contacting member 14, includes a cylindrically shaped body 17 having first circumferential edge 15, second circumferential edge 16, and body surface 17', which extends circumferentially around the circumference of body 17 and extends longitudinally from first edge 15 to second edge 16. Liner-contacting member 14 is rotatably connected to handle 12 through connecting arm 13. As the skilled person will appreciate, connecting arm 13 can be rotatably attached to liner-contacting member 14 through a variety of mechanisms. For example, liner-contacting member 14 may include an axle 13' affixed to body 17 and which is rotatably mounted to connection arm 13. As shown in FIG. 1, cutting element 18 extends circumferentially around body 17 and radially from second edge 16.

As best shown in the enlarged portion of FIG. 1, cutting element 18 includes a radially extending cutting edge 19 and a circumferential base 20, which is affixed to body 17. Cutting edge 19 and base 20 define a cutting element height relative to body 17. In other words, cutting edge 19 has a larger outer diameter than the outer diameter of body 17, and this differential defines a cutting depth (i.e. the depth that cutting element 18 will penetrate into the membrane composite when liner-contacting member 14 is contacted with a release liner. In one or more embodiments, the cutting depth, which may also be referred to as the height of cutting element 18 for the differential between outer edge 19 and base 20, may be greater than 75 µm, in other embodiments greater than 125 µm, and in other embodiments greater than 175 µm. In these or other embodiments, the cutting element depth is less than 300 µm, in other embodiments less than 250 µm, and in other embodiments less than 200 µm. In one or more embodiments the depth of cutting element 18 is from about 75 to about 300 µm, in other embodiments from about 125 to about 250 µm, and in other embodiments from about 175 to about 200 µm.

Figure 2:
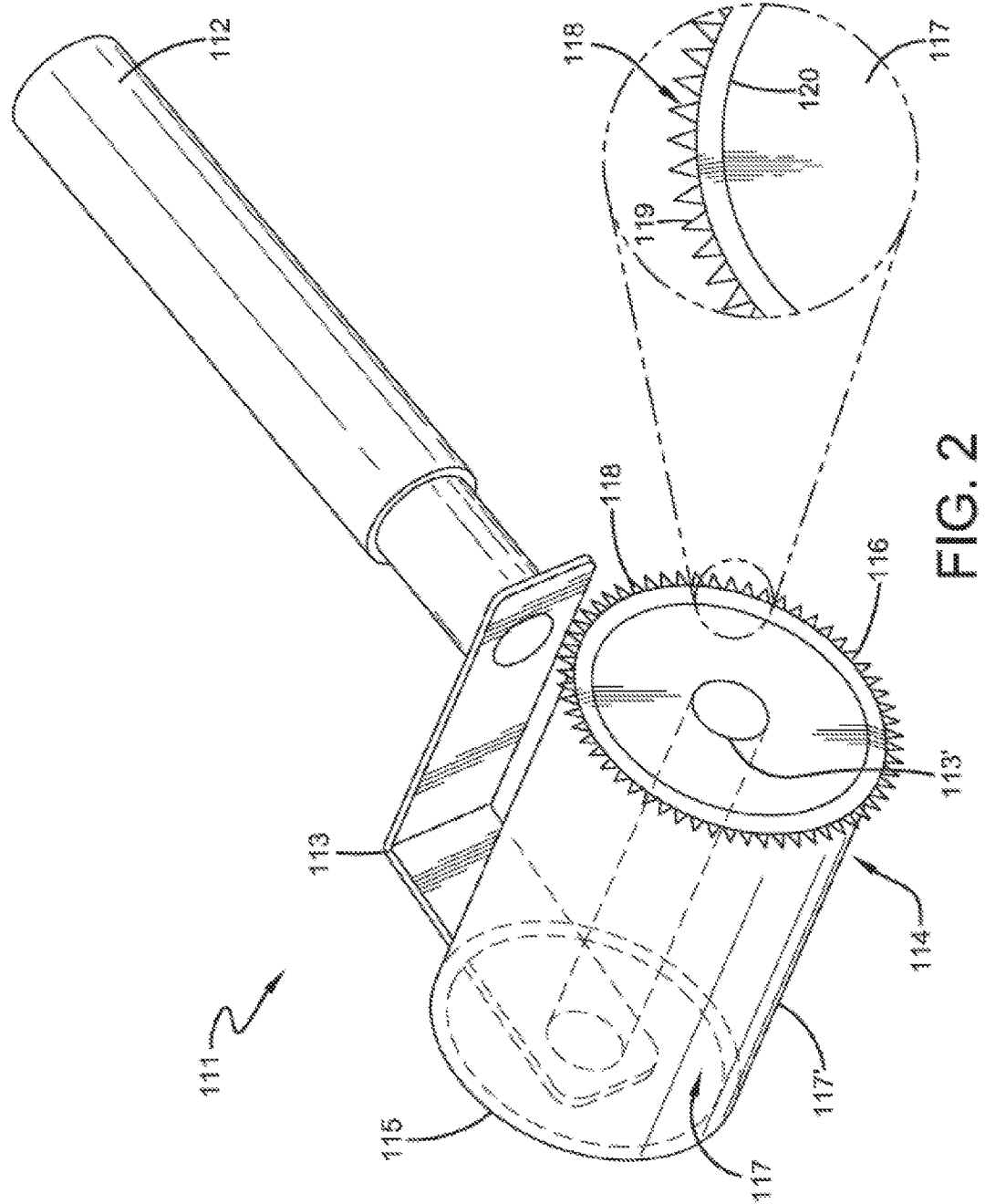
FIG. 2 is a side perspective view, with a detailed view, of another embodiment of a cutting and scoring tool of the present invention.

A second embodiment of the cutting and scoring tools of the present invention can be understood with reference to FIG. 2. Tool 111 includes a handle 112, a release-member contacting element 114, and a cutting element 118. Release-member contacting element 114, which may also be referred to as liner-contacting member 114, includes a cylindrically shaped body 117 having first circumferential edge 115, second circumferential edge 116, and lateral body surface 117, which extends circumferentially around the circumference of body 117 and extends longitudinally from first edge 115 to second edge 116. Liner-contacting member 114 is rotatably connected to handle 112 through connecting arm 113. As the skilled person will appreciate, connecting arm 113 can be rotatably attached to liner-contacting member 114 through a variety of mechanisms. For example, liner-contacting member 114 may include an axle 113' affixed to body 117 and which may be rotatably mounted to connection arm 113. Tool 111 is substantially the same as tool 11 as shown in FIG. 1, but with a different cutting element as will be discussed. However, in either embodiment, the cutting element 18 or cutting element 118 may be disposed in about the middle of the body 17/117 between the respective first and second edges. Positioning of the cutting element 18/118 between the edges may be dictated by a particular end use or specific membrane size or associated seam width.

As best shown in the enlarged portion of FIG. 2, cutting element 118 includes a radially extending serrated cutting edge 119 and a circumferential base 120, which is affixed to body 117. Cutting edge 119 and base 120 define a cutting element height relative to body 117. In other words, cutting edge 119 has an outer diameter larger than the outer diameter of body 117, and this differential defines a cutting depth (i.e. the depth that cutting element 118 will penetrate into the membrane composite when liner-contacting member 114 is contacted with a release liner. In one or more embodiments, the cutting depth, which may also be referred to as the height of cutting element 118 for the differential between outer edge 119 and base 120, may be greater than 75 µm, in other embodiments greater than 125 µm, and in other embodiments greater than 175 µm. In these or other embodiments, the cutting element depth is less than 300 µm, in other embodiments less than 250 µm, and in other embodiments less than 200 µm. In one or more embodiments the depth of cutting element 118 is from about 75 to about 300 µm, in other embodiments from about 125 to about 250 µm, and in other embodiments from about 175 to about 200 µm.

Figure 3:
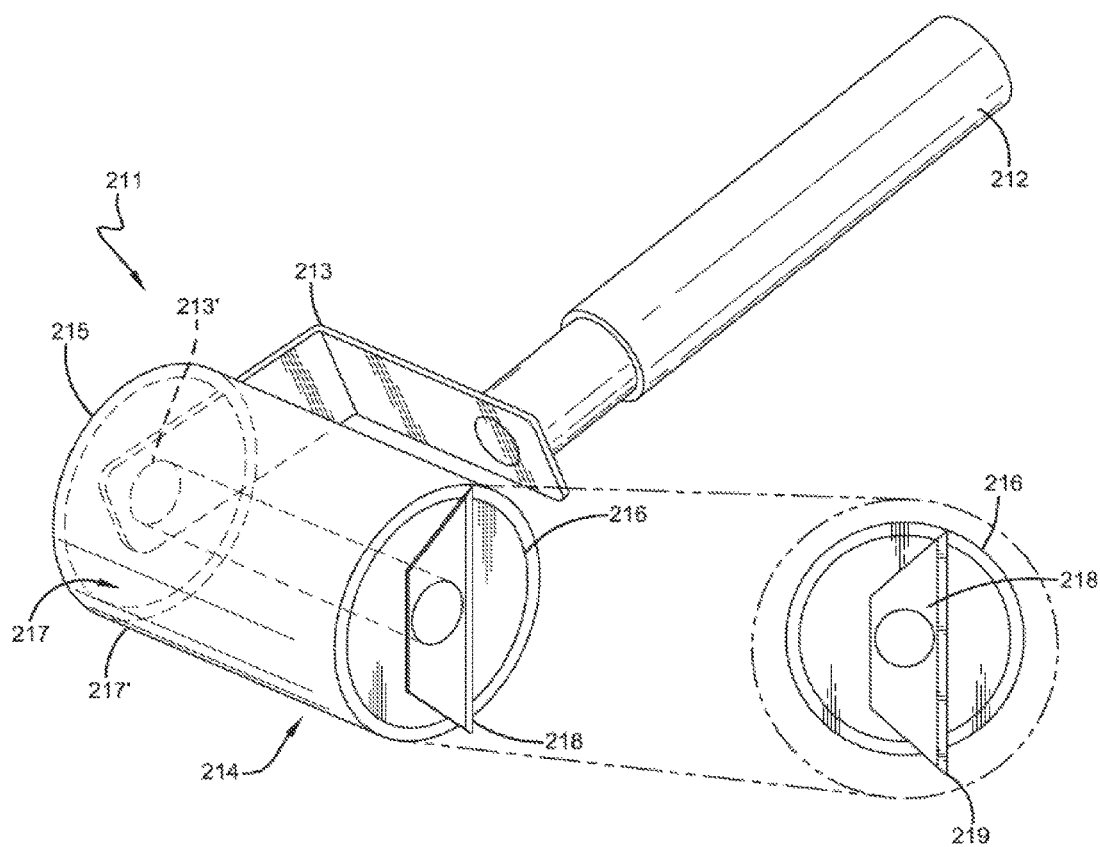
FIG. 3 is a side perspective view, with a detailed view, of yet another embodiment of a cutting and scoring tool of the present invention.

A third embodiment of the cutting and scoring tools of the present invention may be understood with reference to FIG. 3. Tool 211 includes a handle 212, a release-member contacting element 214, and a cutting element 218. Release-member contacting element 214, which may also be referred to as liner-contacting member 214, includes a cylindrically shaped body 217 having first circumferential edge 215, second circumferential edge 216, and body surface 217, which extends circumferentially around the circumference of body 217 and extends longitudinally from first edge 215 to second edge 216. Liner-contacting member 214 is rotatably connected to handle 212 through connecting arm 213. As the skilled person will appreciate, connecting arm 213 can be rotatably attached to liner-contacting member 114 through a variety of mechanisms. For example, liner-contacting member 214 may include an axle 213' affixed to body 217 and which may be mounted to connection arm 213. Tool 211 is substantially the same as tool 11 as shown in FIG. 1, however cutting element 218 is a solid straight razor blade that is affixed to the axle 213' and is adjacent to second circumferential edge 216 as opposed to element 18 of tool 11 which extends circumferentially around body 17 at second edge 16. As such, as the member 214 rotates on the composite, the cutting element remains in a fixed position so that as the tool 211 is moved, the cutting element acts on the release liner and the adhesive layer. In another embodiment, the member 214 and the cutting element 218 may be fixed together so that as the member 214 is pushed or pulled on the composite, the cutting element acts on the release liner and the adhesive layer.

As best shown in the enlarged portion of FIG. 3, cutting element 218 includes an outer cutting edge 219 which extends a radial distance past the second circumferential edge 216 of the liner-contacting member 214. The distance which the outer cutting edge 219 extends past the second circumferential edge 216 defines a cutting element height relative to body 217. In other words, the outer cutting edge 219 of the cutting element 218 makes the cutting element larger than the circumference of body 217, and this differential defines a cutting depth (i.e. the depth that cutting element 218 will penetrate into the membrane composite when liner-contacting member 214 is contacted with a release liner. In one or more embodiments, the cutting depth, or the differential between outer cutting edge 219 and the second circumferential edge 216, may be greater than 75 µm, in other embodiments greater than 125 µm, and in other embodiments greater than 175 µm. In these or other embodiments, the cutting element depth is less than 300 µm, in other embodiments less than 250 µm, and in other embodiments less than 200 µm. In one or more embodiments the depth of cutting element 218 is from about 75 to about 300 µm, in other embodiments from about 125 to about 250 µm, and in other embodiments from about 175 to about 200 µm.

A fourth embodiment of the cutting and scoring tools of the present invention may be described with reference to FIG. 4. Tool 311 includes a handle 312, a release-member contacting element 314, and a cutting element 318. Release-member contacting element 314, which may also be referred to as liner-contacting member 314, includes a sled shaped body 317 having first side 315 and second side 316. Liner-contacting member 314 may be fixedly connected to handle 212 through connecting arm 313. Cutting element 318 is a solid straight razor blade that is affixed to the second side 316. As the member 314 is pushed or pulled on the composite, the cutting element 318 acts on the release liner and the adhesive layer. Orientation of the cutting element 318 with respect to the member 314 may be adjusted as needed.

Figure 4:
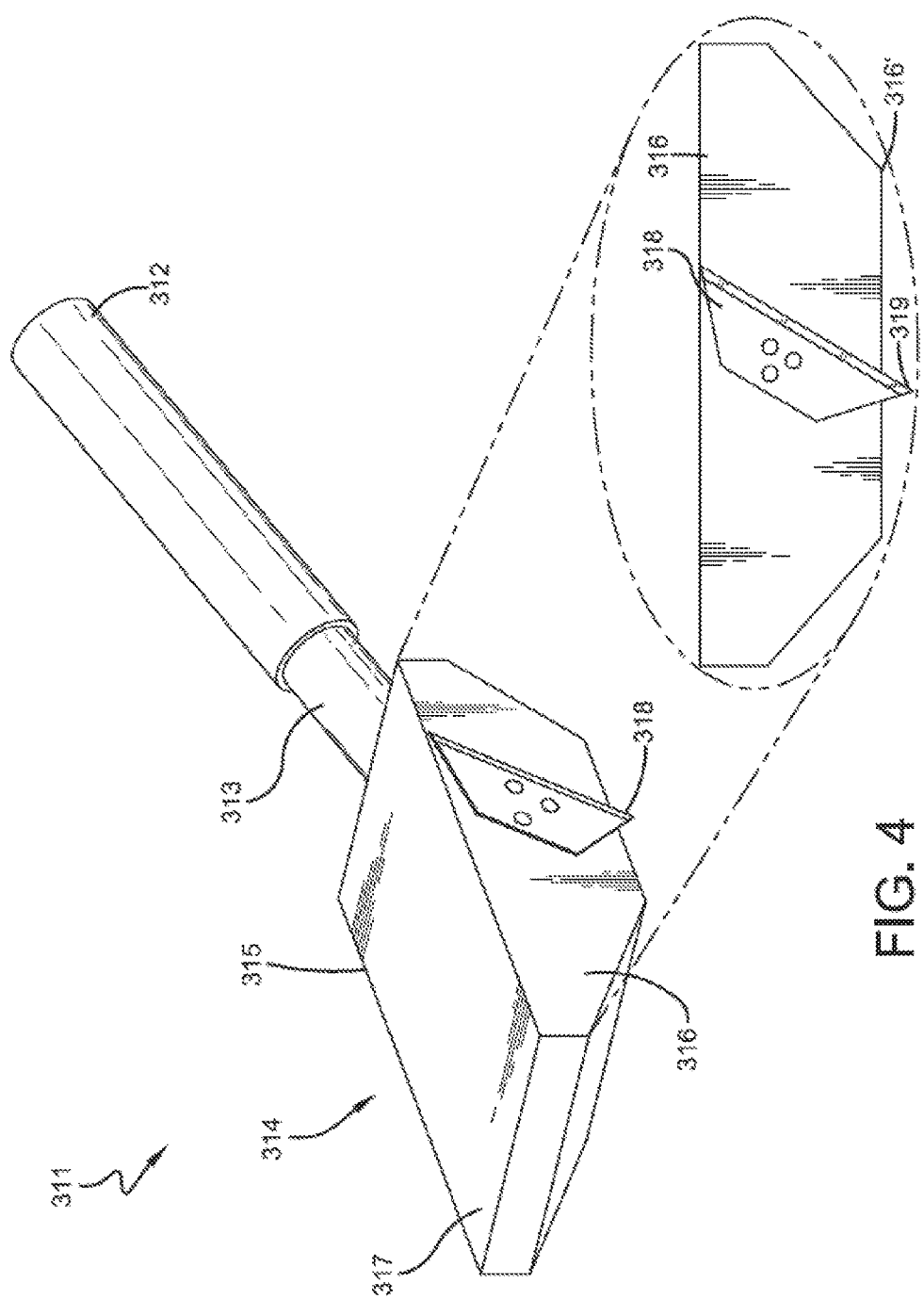
FIG. 4 is a side perspective view, with a detailed view, of still another embodiment of a cutting and scoring tool of the present invention.

As best shown in the enlarged portion of FIG. 4, cutting element 318 includes an outer cutting edge 319 which extends a distance past a lower edge 316' of the second side 316 of the liner-contacting member 314. The distance which the outer cutting edge 319 extends past the lower edge 316' of the second side 316 defines a cutting element height relative to body 317. In other words, the outer cutting edge 319 of the cutting element 318 extends beyond the second side 316 of body 317, and this differential defines a cutting depth (i.e. the depth that cutting element 318 will penetrate into the membrane composite when liner-contacting member 314 is contacted with a release liner). In one or more embodiments, the cutting depth, or the differential between outer cutting edge 319 and the lower edge 316' of the second side 316, may be greater than 75 µm, in other embodiments greater than 125 µm, and in other embodiments greater than 175 µm. In these or other embodiments, the cutting element depth is less than 300 µm, in other embodiments less than 250 µm, and in other embodiments less than 200 µm. In one or more embodiments the depth of cutting element 318 is from about 75 to about 300 µm, in other embodiments from about 125 to about 250 µm, and in other embodiments from about 175 to about 200 µm.

As the skilled person will appreciate, cutting element 18, 118, 218, and 318 should be fabricated of an appropriate material that will allow cutting element 18, 118, 218, and 318 to cut a release member and simultaneously score a factory-applied adhesive layer. Accordingly, useful materials for fabricating cutting element 18, 118, 218, and 318 may include various ceramics, metals, and/or their alloys that are known in the art for making blades. For example, steel may be used. The other components of tool 11, 11, 211, and 311 may be fabricated from various materials based upon preference or cost. Furthermore, in some embodiments, the cutting element 18, 118, 218, and 318 may be retractable so that no edge of the cutting element 18, 118, 218, and 318 can be used when the linear-contacting member 14, 114, 214, and 314 is contacting a suitable membrane. Liner-contacting member 14, 114, 214, and 314 may, for example, be selected from materials that are compatible with cutting element 18, 118, 218, and 318. For example, where cutting element 18, 118, 218, and 318 is fabricated from a metal, such as steel, liner-contacting member 14, 114, 214, and 314 may likewise be fabricated of steel or similar metal.

Membrane Composite

Figure 5:
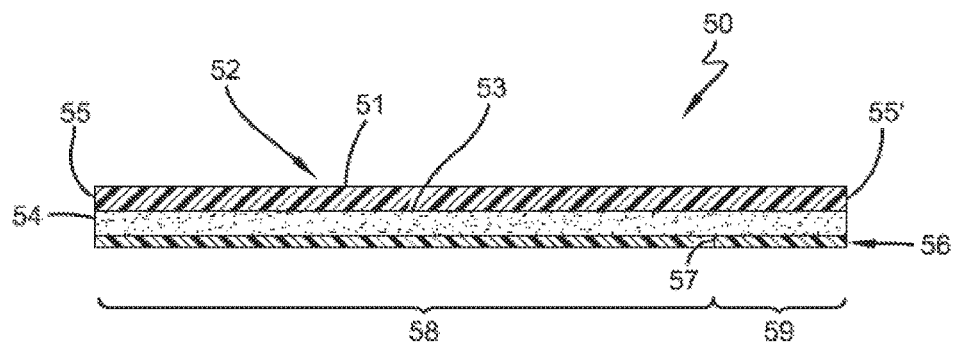
FIG. 5 is a cross-sectional side view (not to scale) of a roofing composite employed in the practice of the present invention.

A membrane composite according to embodiments of the present invention can be described with reference to FIG. 5, which shows membrane composite 50 including polymeric planar body 52, adhesive layer 54, and release member 56. Planar body 52 includes top planar surface 51, bottom planar surface 53, first lateral edge 55, and second lateral edge 55'. Adhesive layer 54, which is a pressure sensitive adhesive, is disposed (i.e. deposited) on bottom planar surface 53 and extends the entire width of planar body 52 from first lateral edge 55 to an opposed second lateral edge 55'. Release member 56 covers adhesive layer 54 on a surface thereof opposite planar body 52. In particular embodiments, release member 56 may include perforation 57, which allows the contractor to not have to set a straight edge in order to remove the release member 56 in order to separately expose roof-surface contacting portion 58 and lap area portion 59. Alternatively, the same functionality can be achieved by employing two separate release members, one removably affixed to the roof-surface contacting portion and the other removably affixed to the lap area portion.

Roof System

Figure 6:
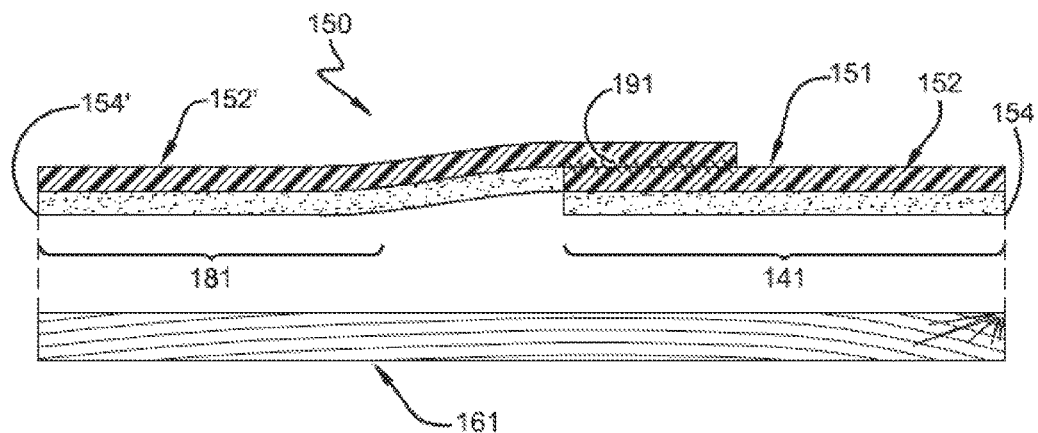
FIG. 6 is a partially exploded cross-sectional side view (not to scale) of a roof system according to embodiments of the present invention.

A roof system according to embodiments of the present invention can be described with reference to FIG. 6, which shows roof system 150 including first membrane composite 152 and second membrane composite 152', which are both adhesively secured to roof substrate 161. Specifically, membrane composite 152 is adhesively secured to substrate 161 through adhesive layer 154 along a roof-surface contacting region 141. And, membrane composite 152' is secured to roof substrate 161 through adhesive layer 154' along a roof-substrate contacting region 181. Additionally, the composite membrane 152' is heat melted to membrane composite 152, on an upper surface 151 thereof, to form a lap seam 191.

Pressure-Sensitive Adhesive

In one or more embodiments, adhesive layer 54/154/154', which is a pressure-sensitive adhesive, is prepared from a holt-melt adhesive, which is an adhesive that can be extruded or otherwise flows when heated to threshold temperatures, and therefore can be applied in the absence of a carrier or solvent. In other embodiments, pressure-sensitive adhesive layer is prepared from a solvent-borne adhesive, which includes those compositions where the solids portion of the adhesive is dissolved or suspended in a solvent, applied to the membrane in the form of a liquid, and the solvent is evaporated to leave the adhesive layer.

In one or more embodiments, the thickness of pressure-sensitive adhesive layer may be at least 15 µm, in other embodiments at least 30 µm, in other embodiments at least 45 µm, and in other embodiments at least 60 µm. In these or other embodiments, the thickness of pressure-sensitive adhesive layer may be at most 1000 µm, in other embodiments at most 600 µm, in other embodiments at most 300 µm, in other embodiments at most 150 µm, and in other embodiments at most 75 µm. In one or more embodiments, the thickness of pressure-sensitive adhesive layer may be from about 15 µm to about 600 µm, in other embodiments from about 15 µm to about 1000 µm, in other embodiments from about 30 µm to about 300 µm, and in other embodiments from about 45 µm to about 150 µm.

In one or more embodiments, especially where the pressure-sensitive adhesive is a hot-melt adhesive, the pressure-sensitive adhesive composition may be characterized as a solid at temperatures below 200° F., in other embodiments below 190° F., in other embodiments below 180° F., and in other embodiments below 170° F. In these or other embodiments, the pressure-sensitive adhesive composition is characterized as a fluid above 200° F., in other embodiments above 250° F., in other embodiments above 300° F., and in other embodiments above 350° F.

Exemplary pressure-sensitive adhesive compositions that may be employed in practicing the present invention include those compositions based upon acrylic polymers, butyl rubber, ethylene vinyl acetate, natural rubber, nitrile rubber, silicone rubber, styrene block copolymers, ethylene-propylene-diene rubber, ataticpolyalpha olefins, and vinyl ether polymers. In combination with these base polymers, the pressure-sensitive adhesive compositions may include a variety of complementary constituents such as, but not limited to, tackifying resins, waxes, antioxidants, and plasticizers.

In particular embodiments, the pressure-sensitive adhesive compositions of the present invention include polystyrene block copolymers. These block copolymers include at least two types of blocks, which may be referred to as A and B blocks, where the A blocks represent blocks deriving from the polymerization of at least one vinyl aromatic monomer (e.g., styrene) and the B blocks derive from the polymerization of at least one conjugated diene monomer (e.g., butadiene). Exemplary vinyl aromatic monomer includes styrene, p-methylstyrene, α-methylstyrene, and vinylnaphthalene. Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

In particular embodiments, the block copolymers include at least two A blocks and at least one B block. For example, the use of A-B-A block copolymers is specifically contemplated. In one or more embodiments, the B block may be hydrogenated. In one or more embodiments, the B block is characterized by at least 75 percent hydrogenation, in other embodiments at least 85 percent hydrogenation, and in other embodiments at least 95 percent hydrogenation, where the percent hydrogenation refers to the number of original double bonds within the block reduced by hydrogenation. For example, a polymer block that is 95 percent hydrogenated includes 5 percent of the original double bonds. In one or more embodiments, the aromatic unsaturation within the A blocks is hydrogenated by less than 25 percent, in other embodiments less than 15 percent, and in other embodiments less than 5 percent.

In one or more embodiments, each A block has an number average molecular weight of at least 2 kg/mole, in other embodiments at least 5 kg/mole, and in other embodiments at least 25 kg/mole. In these or other embodiments, each A block has an number average molecular weight of less than 125 kg/mole, in other embodiments less than 75 kg/mole, and in other embodiments less than 50 kg/mole.

In one or more embodiments, each B block has a number average molecular weight of at least 10 kg/mole, in other embodiments at least 30 kg/mole, and in other embodiments at least 50 kg/mole. In these or other embodiments, each A block has an number average molecular weight of less than 250 kg/mole, in other embodiments less than 175 kg/mole, and in other embodiments less than 125 kg/mole.

Exemplary styrene block copolymers include styrene-butadiene-styrene block copolymer, hydrogenated styrene-butadiene-styrene block copolymer (which may also be referred to as styrene-ethylene/butene-styrene block copolymer), styrene-isoprene-styrene block copolymer, and hydrogenated styrene-isoprene-styrene block copolymer (which may also be referred to as styrene-ethylene/propylene-styrene block copolymer). For ease of description, these polymers may be referred to, respectively, as S-B-S block copolymer, S-E/B-S block copolymer, S-I-S block copolymer, and S-E/P-S block copolymer.

The polystyrene block copolymer-based, pressure-sensitive adhesive compositions used in this invention may also include a modifying resin. In one or more embodiments, modifying resins include end-block modifying resins and/or mid-block modifying resins. As is known in the art, end-block modifying resins include those resins that modify and/or reinforce the styrene blocks of the block copolymer. It is believed that these end-block modifying resins form pseudo cross links between polymer chains. In one or more embodiments, these end-block resins are characterized by a ring and ball softening point of at least 90° C., in other embodiments at least 100° C., in other embodiments at least 110° C., in other embodiments at least 120° C., in other embodiments at least 140° C., and in other embodiments at least 160° C. Exemplary end-block modifying resins include coumarone-indene resins, poly-α-methylstyrene resins, polystyrene resins, vinyl toluene-α-methylstyrene copolymer resins, and polyindene resins. In these or other embodiments, mid-block modifying resins are employed. As is known in the art, mid-block modifying resins include those resins that modify and/or reinforce the diene blocks of the block copolymer. It is believed that these mid-block modifying resins form pseudo cross links between polymer chains. In one or more embodiments, mid-block modifying resins include aliphatic resins such as pentene-type resins, terpene resins, and cycloaliphatic resins.

Exemplary polyphenylene ether resins, such as polyphenylene oxide, may also be used. In one or more embodiments, these resins are characterized by an intrinsic viscosity of less than 0.4 dl/g, in other embodiments less than 0.35 dl/g, and in other embodiments less than 0.2 dl/g, when measured in solution in chloroform at 25° C. Useful polyphenylene ether resins are described in U.S. Pat. Nos. 3,306,874 and 3,257,375, which are incorporated herein by reference.

In one or more embodiments, the pressure-sensitive adhesives based upon styrene block copolymers may also include an adhesive promoting resin or tackifying resin. In one or more embodiments, a hydrogenated tackifying resin is employed. These resins include, but are not limited to, petroleum resins, synthetic polyterpenes, resin esters and natural terpenes, and combinations thereof. In certain embodiments, the resin modifiers soften or become liquid at temperatures of about 40° C. to about 150° C. In certain embodiments, the resin modifiers have number average molecular weights, as measured by vapor phase osmometry, below that of the polymeric material included in the polymeric film. In certain embodiments, the number average molecular weights of the resin modifiers are less than about 5,000. In other embodiments, the number average molecular weights of the resin modifiers are less than about 1,000. In additional embodiments, the number average molecular weights of the resin modifiers are from about 500 to about 1000.

In certain embodiments, the resin modifiers have ring and ball softening point of about 20° C. to about 160° C. In additional embodiments, resin modifiers have ring and ball softening points of about 40° C. to about 160° C. In still other embodiments, resin modifiers have ring and ball softening points of about 50° C. to about 160° C.

Various types of natural and synthetic resins, alone or in admixture with each other, may be used be selected as the resin modifier. Suitable resins include, but are not limited to, natural rosins and rosin esters, hydrogenated rosins and hydrogenated rosin esters, coumarone-indene resins, petroleum resins, polyterpene resins, and terpene-phenolic resins. Specific examples of suitable petroleum resins include, but are not limited to, aliphatic hydrocarbon resins, hydrogenated aliphatic hydrocarbon resins, mixed aliphatic and aromatic hydrocarbon resins, hydrogenated mixed aliphatic and aromatic hydrocarbon resins, cycloaliphatic hydrocarbon resins, hydrogenated cycloaliphatic resins, mixed cycloaliphatic and aromatic hydrocarbon resins, hydrogenated mixed cycloaliphatic and aromatic hydrocarbon resins, aromatic hydrocarbon resins, substituted aromatic hydrocarbons, and hydrogenated aromatic hydrocarbon resins. As used herein, "hydrogenated" includes fully, substantially and at least partially hydrogenated resins. Suitable aromatic resins include aromatic modified aliphatic resins, aromatic modified cycloaliphatic resin, and hydrogenated aromatic hydrocarbon resins. Any of the above resins may be grafted with an unsaturated ester or anhydride to provide enhanced properties to the resin. For additional description of resin modifiers, reference can be made to technical literature, e.g., Hydrocarbon Resins, Kirk-Othmer, Encyclopedia of Chemical Technology, 4th Ed. v. 13, pp. 717-743 (J. Wiley & Sons, 1995).

In one or more embodiments, the tackifier resins include phenol-based resins. Included among the phenol-based resins are phenolic resins. These resins may include reactive phenol resins (also referred to as functionalized phenol resins), as well as unreactive resins. In one or more embodiments, the phenolic resin is a resole resin, which can be made by the condensation of alkyl, substituted phenols, or unsubstituted phenols with aldehydes such as formaldehyde in an alkaline medium or by condensation of bi-functional phenoldialcohols. In one or more embodiments, this condensation reaction occurs in the excess or molar equivalent of formaldehyde. In other embodiments, the phenolic resin may be formed by an acid-catalyzed reaction.

In one or more embodiments, the tackifier resin is a polybutene polymer or oligomer. In particular embodiments, polybutene oils are employed. Useful polybutene oils include high-viscosity oils that may be characterized by a viscosity at 100° C. of at least 80 cst, in other embodiments at least 100 cst, or in other embodiments at least 120 cst up to, for example, about 700 or 800 cst. In these or other embodiments, the high viscosity polybutene oils may be characterized by a molecular weight of at least 1000 g/mole, in other embodiments at least 1200 g/mole, or in other embodiments at least 1300 g/mole up to, for example, 1400 or 1500 g/mole. An exemplary high-viscosity polybutene oil is available under the tradename Indapol H300 (Ineos) or PB32 (Soltex).

In particular embodiments, the tackifying resins include hydrogenated rosins, esters of rosins, polyterpenes, terpene phenol resins, and polymerized mixed olefins. In one or more embodiments, these resins are liquids at room temperature.

In one or more embodiments, the pressure-sensitive adhesive layer (e.g. layer 23) is a cured pressure-sensitive adhesive. In sub-embodiments thereof, this cured pressure-sensitive adhesive layer is formed from a curable hot-melt adhesive. In other words, and as will be described in greater detail below, an uncured adhesive composition is applied to the membrane as a hot-melt composition (i.e. the composition is heated and applied as a flowable composition in the absence or appreciable absence of solvent), and then the composition is subsequently crosslinked (i.e. cured) to form the cured pressure-sensitive layer.

In one or more embodiments, the cured pressure-sensitive adhesive layer may be an acrylic-based hot-melt adhesive. In one or more embodiments, the adhesive is a polyacrylate such as a polyacrylate elastomer. In one or more embodiments, useful polyacrylates include one or more units defined by the formula:

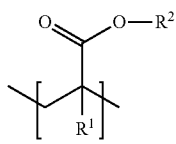

where each R1 is individually hydrogen or a hydrocarbyl group and each R2 is individually a hydrocarbyl group. In the case of a homopolymer, each R1 and R2, respectively, throughout the polymer are same in each unit. In the case of a copolymer, at least two different R1 and/or two different R2 are present in the polymer chain. In one or more embodiments, these hot-melt adhesives may be cured (i.e., crosslinked) by UV light.

In one or more embodiments, hydrocarbyl groups include, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms. In particular embodiments, each R2 is an alkyl group having at least 4 carbon atoms. In particular embodiments, R1 is hydrogen and R2 is selected from the group consisting of butyl, 2-ethylhexyl, and mixtures thereof.

In one or more embodiments, the polyacrylate elastomers that are useful as adhesives in the practice of this invention may be characterized by a glass transition temperature (Tg) of less than 0° C., in other embodiments less than −20° C., in other embodiments less than −30° C. In these or other embodiments, useful polyacrylates may be characterized by a Tg of from about −70 to about 0° C., in other embodiments from about −50 to about −10° C., and in other embodiments from about −40 to about −20° C.

In one or more embodiments, the polyacrylate elastomers that are useful as adhesives in the practice of this invention may be characterized by a number average molecular weight of from about 90 to about 800 kg/mole, in other embodiments from about 100 to about 350 kg/mole, in other embodiments from about 100 to about 700 kg/mole, in other embodiments from about 150 to about 270 kg/mole, in other embodiments from about 120 to about 600 kg/mole, and in other embodiments from about 180 to about 250 kg/mole.

In one or more embodiments, the polyacrylate elastomers that are useful as adhesives in the practice of this invention may be characterized by a Brookfield viscosity at 150° C. of from about 10,000 to about 200,000 cps, in other embodiments from about 30,000 to about 60,000 cps, in other embodiments from about 30,000 to about 170,000 cps, in other embodiments from about 25,000 to about 150,000 cps, in other embodiments from about 30,000 to about 60,000 cps, and in other embodiments from about 40,000 to about 50,000 cps.

Specific examples of polyacrylate elastomers that are useful as adhesives in the practice of the present invention include poly(butylacrylate), and poly(2-ethylhexylacrylate). These polyacrylate elastomers may be formulated with photoinitiators, solvents, plasticizers, and resins such as natural and hydrocarbon resins. The skilled person can readily formulate a desirable adhesive composition. Useful adhesive compositions are disclosed, for example, in U.S. Pat. Nos. 6,720,399, 6,753,079, 6,831,114, 6,881,442, and 6,887,917, which are incorporated herein by reference.

In other embodiments, the polyacrylate elastomers may include polymerized units that serve as photoinitiators. These units may derive from copolymerizable photoinitiators including acetophenone or benzophenone derivatives. These polyacrylate elastomers and the adhesive compositions formed therefrom are known as disclosed in U.S. Pat. Nos. 7,304,119 and 7,358,319, which are incorporated herein by reference.

In one or more embodiments, the hot-melt adhesive is at least partially cured after being applied to the membrane, as will be discussed in greater detail below. In one or more embodiments, the adhesive is cured to an extent that it is not thermally processable in the form it was prior to cure. In these or other embodiments, the cured adhesive is characterized by a cross-linked infinite polymer network. While at least partially cured, the adhesive layer of one or more embodiments is essentially free of curative residue such as sulfur or sulfur crosslinks and/or phenolic compounds or phenolic-residue crosslinks.

As indicated above, the pressure-sensitive adhesive, in its cured stated, provides sufficient tack to allow the membrane composites of this invention to be used in roofing systems that meet industry standards for wind uplift resistance. In one or more embodiments, this tack may be quantified based upon the peel strength when adhered to another membrane in accordance with ASTM D-1876-08. In one or more embodiments, the cured pressure-sensitive adhesive of the present invention is characterized by a peel strength, according to ASTM D-1876-08, of at least 1.8 lbf/in, in other embodiments at least 3.6 lbf/in, in other embodiments at least 8.0 lbf/in, in other embodiments at least 15 lbf/in, and in other embodiments at least 20 lbf/in.

Similarly, the tack of the pressure-sensitive adhesive, in its cured state, may be quantified based upon the peel strength when adhered to a construction board (e.g. insulation board) having a kraft paper facer in accordance with ASTM D-903-98 (2010). In one or more embodiments, the cured pressure-sensitive adhesive of the present invention is characterized by a peel strength, according to ASTM D-903-98 (2010) using an insulation board with kraft paper facer, of at least 1.5 lbf/in, in other embodiments at least 2.0 lbf/in, in other embodiments at least 2.5 lbf/in, in other embodiments at least 3.0 lbf/in, and in other embodiments at least 3.5 lbf/in.

Release Member

In one or more embodiments, the release member (e.g. release member 56), which may also be referred to as a release liner or release paper, may include a polymeric film or extrudate, or in other embodiments it may include a cellulosic substrate. In one or more embodiments, the polymeric film and/or cellulosic substrate can carry a coating or layer that allows the polymeric film and/or cellulosic substrate to be readily removed from the adhesive layer after attachment. This polymeric film or extrudate may include a single polymeric layer or may include two or more polymeric layers laminated or coextruded to one another.

Suitable materials for forming a release member that is a polymeric film or extrudate include polypropylene, polyester, high-density polyethylene, medium-density polyethylene, low-density polyethylene, polystyrene or high-impact polystyrene. The coating or layer applied to the film and/or cellulosic substrate may include a silicon-containing or fluorine-containing coating. For example, a silicone oil or polysiloxane may be applied as a coating. In other embodiments, hydrocarbon waxes may be applied as a coating. As the skilled person will appreciate, the coating, which may be referred to as a release coating, can be applied to both planar surfaces of the film and/or cellulosic substrate. In other embodiments, the release coating need only be applied to the planar surface of the film and/or cellulosic substrate that is ultimately removably mated with the adhesive layer.

In one or more embodiments, the release member is characterized by a thickness of from about 15 to about 80 µm, in other embodiments from about 18 to about 75 µm, and in other embodiments from about 20 to about 50 µm.

Membrane Panel

In one or more embodiments, the membrane, which may be referred to as a panel may be a thermoset material. In other embodiments the membrane may be a thermoformable material. In one or more embodiments, the membrane may be EPDM based. In other embodiments, the membrane may be TPO based. In these or other embodiments, the membrane may be flexible and capable of being rolled up for shipment. In these or other embodiments, the membrane may include fiber reinforcement, such as a scrim. In one or more embodiments, the membrane includes EPDM membranes including those that meet the specifications of the ASTM D-4637. In other embodiments, the membrane includes thermoplastic membranes including those that meet the specifications of ASTM D-6878-03. Still other membranes may include PVC, TPV, CSPE, and asphalt-based membranes.

In one or more embodiments, the roofing membrane panels are characterized by conventional dimensions. For example, in one or more embodiments, the membrane panels may have a thickness of from about 500 µm to about 3 mm, in other embodiments from about 1,000 µm to about 2.5 mm, and in other embodiments from about 1,500 µm to about 2 mm. In these or other embodiments, the membrane panels of the present invention are characterized by a width of about 1 m to about 20 m, in other embodiments from about 2 m to about 18 m, and in other embodiments from about 3 m to about 15 m.

Roof Substrate

Practice of the present invention is not necessarily limited by the selection of any particular roof substrate to which the membranes can be attached in forming the roof systems of the present invention. In one or more embodiments, the roof substrate may include the roof deck. In other embodiments, the roof substrate may include an intervening construction layer disposed (i.e. installed) above the roof deck. As the skilled person will appreciate, these intervening layers may include, but are not limited to, insulation boards, cover boards, underlayment, and existing membranes.

Installation of Composite Membranes Using the Cutting and Scoring Tool

The membrane composites of the present invention can advantageously be applied to a roof surface (also known as roof substrate) by using standard peel-and-stick techniques. For example, the membrane can be unrolled on a roof surface and placed into position. Portions of the membrane are then typically folded back and portions of the release member are removed. The membrane can then subsequently be adhered to the roof surface by using various techniques including the use of rollers and the like to mate the adhesive to the substrate. Either before or after securing the membrane to the roof surface, adjacent membrane panels are joined through a seaming process. In the case of thermoplastic membranes, the seaming process may include heat welding adjacent seams. Where thermoset membranes are employed, either liquid adhesives or tapes can be used to form an overlapping seam.

Figure 7A:
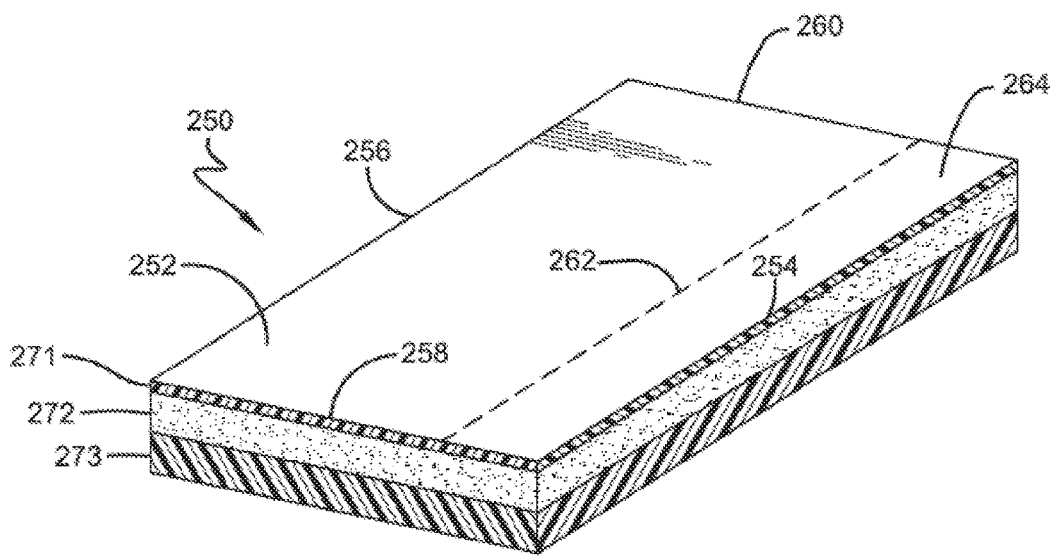
FIG. 7A is a cross-sectional perspective view (not to scale) of a roofing composite employed in the practice of the present invention.

Prior to heat seaming in the case of thermoplastic membrane or application of a liquid or solids-based adhesive tape in the case of a thermoset membrane, it may be necessary to remove factory-applied adhesive in the lap region. In order to do so, according to embodiments of the present invention, the release liner is cut along a line perpendicular to the lap edge at a distance from the lap edge that creates a lap area or region. For example, as shown in FIG. 7A, composite 250 includes a first planar surface 252, first lateral edge 254, and second lateral edge 256, with each lateral edge extending longitudinally. Composite 250 further includes first longitudinal edge 258 and second longitudinal edge 260, with each longitudinal edge extending laterally between first lateral edge 254 and second lateral edge 256. As also shown in FIG. 7A, cut/score line 262 defines a lap area region 264 between first lateral edge 254 and cut/score line 262. Cut/score line 262, as shown, extends longitudinally parallel to first lateral edge 254. The skilled person will appreciate that a similar cut/score line can be formed laterally along first or second longitudinal edges 258, 260.

Figure 7B:
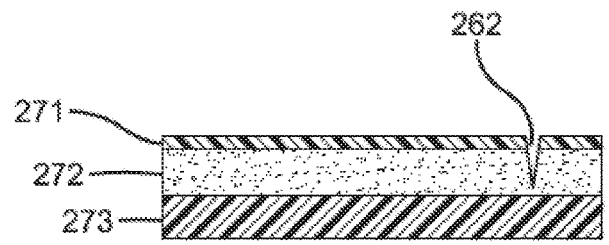
FIG. 7B is a cross-sectional side view (not to scale) of the roofing composite of FIG. 7A showing a cut made by a cutting and scoring tool of the present invention.
Figure 8:
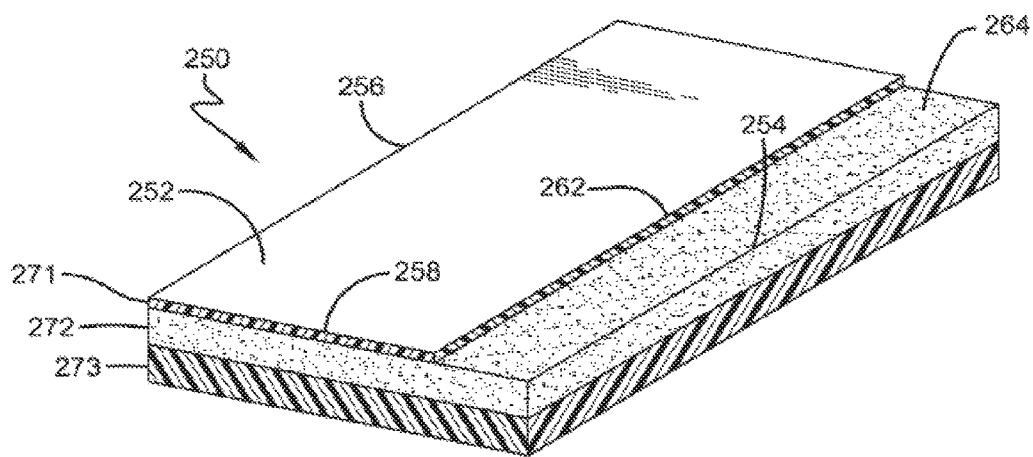
FIG. 8 is a cross-sectional perspective view of a roofing composite of FIG. 7A with the release member removed from the lap section of the composite.

According to aspects of the present invention, the cutting and scoring tools described herein advantageously cut the release liner 271 while simultaneously scoring the factory-applied adhesive layer 272 at a substantially constant depth without cutting or scoring the membrane layer 273 of the composite 250. As best shown in FIG. 7B, the cutting and scoring tool of the present invention serves to cut release member 271, and at least partially score adhesive layer 272, while maintaining the integrity of membrane layer 273. Once the release member 271 has been cut and the factory-applied adhesive 272 has been scored, the cut release member 271 is removed from the lap area region 264, as best shown in FIG. 8. As the skilled person will appreciate, this can be simply accomplished by pulling away the selected release member, which is removably attached to the underlying factory-applied adhesive layer.

Figure 8A:
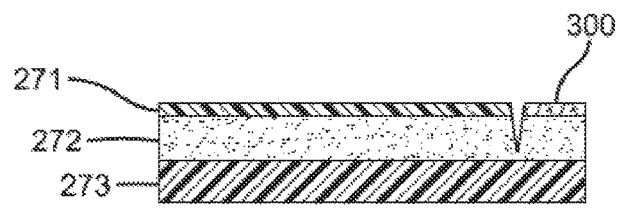
FIG. 8A is a cross-sectional side view (not to scale) of the roofing composite with the scored release member removed and a high-tensile member attached in a lap area in the practice of the present invention.
Figure 8B:
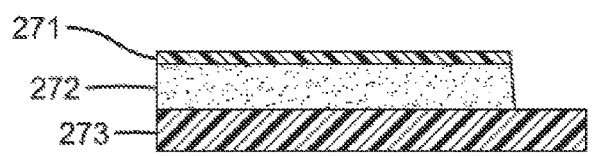
FIG. 8B is a cross-sectional side view (not to scale) of the roofing composite with the high-tensile member and underlying pressure-sensitive adhesive removed from the lap area in the practice of the present invention.

Once the selected release member 271 has been removed from the lap area region 264, which thereby exposes the underlying factory-applied adhesive 272, a high-tensile member 300 is adhesively mated to the exposed factory-applied adhesive 272 as shown in FIG. 8A (i.e. the high-tensile member is adhesively mated to the factory-applied adhesive in the lap region.) Practice of the present invention is not necessarily limited by the selection of a high-tensile member. In particular embodiments, a high-tensile fabric is employed. In these or other embodiments, the high-tensile fabric carries an adhesive layer; in other words, a pressure-sensitive adhesive tape including a fabric backing may be employed. In one or more embodiments, the high-tensile member includes duct tape. Once the high-tensile member has been adhesively mated to the factory-applied adhesive 272 within the lap area region 264, the high-tensile member 300 is forcibly removed, which results in removal of the factory-applied adhesive 272 within the lap area region 264 as shown in FIG. 8B. Advantageously, the presence of the score line within the factory-applied adhesive layer 272 results in the substantial removal of the factory-applied adhesive 272 only in the lap region 260. Once the factory-applied adhesive 272 has been removed within the lap region 260, seaming of adjacent membranes can take place. As suggested above, where the membranes are thermoplastic membranes, adjacent membranes can be heat welded. Alternatively, where the membranes are thermoset membranes, adjacent membranes can be seamed by use of an adhesive, such as a liquid adhesive or a tape adhesive.

Depending on the particular tool employed, the step of cutting the release member and scoring the underlying factory-applied adhesive may vary. For example, if either tool 11, 211, or 311 is used, the second circumferential edge 16, 216, or 316 of the release-member contacting element 14, 214, or 314 must be placed against the cut/score line 262 for the cutting element 18, 218, or 318 to work properly.

The cutting and scoring tools of the present invention described herein are used to facilitate the removal of the adhesive prior to securing the adjacent membranes together. It has also advantageously been discovered that the cutting and scoring tools of the present invention help to facilitate how deep the cut is when the release liner and the pressure-sensitive adhesive are removed so as not to cut into and damage the membrane.

In one or more embodiments, the cutting element of the cutting and scoring tools described herein scores the factory-applied adhesive layer at a percent depth into the adhesive layer of greater than 50%, in other embodiments greater than 60%, and in other embodiments greater than 70%. In these or other embodiments, the cutting element scores the factory-applied adhesive layer at less than 100%, in other embodiments less than 90%, and in other embodiments less than 80%. In one or more embodiments the cutting element scores the factory-applied adhesive layer from about 50% to about 100% depth into the adhesive layer, in other embodiments from about 60% to about 90% depth into the adhesive layer, and in other embodiments from about 70% to about 80% depth into the adhesive layer.

Figure 9:
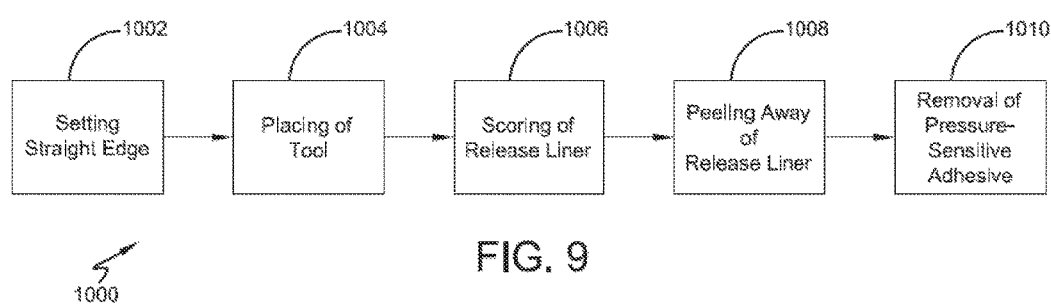
FIG. 9 is a flow chart describing a process for using the release liner scoring tool of the present invention to remove pressure-sensitive adhesive along a lap edge of a roofing composite.

The foregoing method can be described with reference to FIG. 9, which shows process 1000 for removing the pressure-sensitive adhesive along the lap edge of a membrane according to the present invention generally begins with a step of setting a straight edge 1002, wherein a straight edge or a line is marked at the lap edge of the membrane where desired. Following the setting of a cut line along the straight edge, the cutting element of one of the cutting and scoring tools described herein is placed during a placing step 1004 along the line or straight edge formed in step 1002. Following the placing of one of the cutting and scoring tools described herein, cutting of the release liner and scoring of the adhesive layer is achieved during a cutting/scoring step 1006. Following the cutting of the release liner and scoring of the adhesive layer, the release liner in the lap area region is peeled away during a peeling step 1008. Finally, once the selected release liner is peeled away, the now scored pressure-sensitive adhesive is removed during a removal step 1010 and the edge of the membrane is now prepped to be secured to an adjacent membrane.

Figure 10:
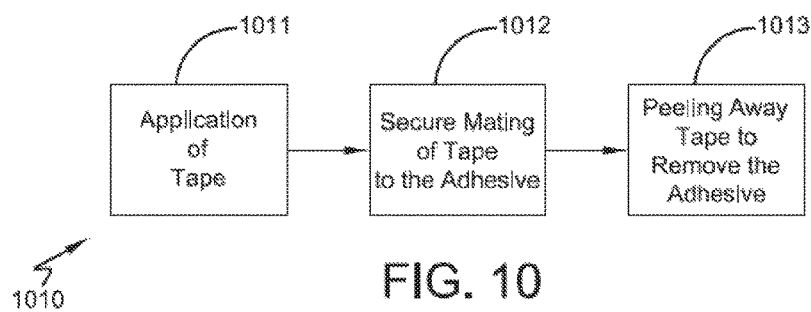
FIG. 10 is a flow chart describing sub-steps of the removal steps shown in FIG. 9.

In some embodiments, the pressure-sensitive adhesive is removed during the removal step 1010 by the application of a high-tensile member 300 being placed over the exposed adhesive. As shown in FIG. 10, the removal step 1010 includes a sub-step 1011 of applying the high-tensile member, a sub-step 1012 of using a roller or one's hand to securely mate the high-tensile member to the underlying adhesive, and a final sub-step 1013 of peeling away (forcibly removing) the high-tensile member so as to remove the adhesive from the lap edge of the membrane.

In some embodiments, the placing step 1004 and scoring step 1006 occurs as follows. The release-member contacting element of one of the cutting and scoring tools described herein is placed at the beginning of the straight edge/cut line created in step 1002. Specifically, the release-member contacting element is placed so that the cutting element is aligned with the straight edge/cut line formed in step 1002. Then, once placed, the user of the cutting and scoring tool of the present invention will grab a hold of the handle and push the tool along the surface of the membrane so that the release member contact element rolls along the surface (as with either tool 11 or 111) or glides along the surface (as with either tool 211 or 311). Once the release member contact element is either rolling or gliding along the surface of the membrane, the cutting element will be run across the membrane at the cut line so as to cut the release member and score the adhesive.

Alternative Embodiment—Scoring Tool

Alternative embodiments of the invention provide a scoring tool and associated methods. For example, the scoring tool of one or more embodiments of the present invention includes a liner-contacting member having a trapezoidal shape wherein the liner-contacting member contains three flat sides and one beveled side used to score the release paper and the adhesive layer of a membrane composite.

Figure 11:
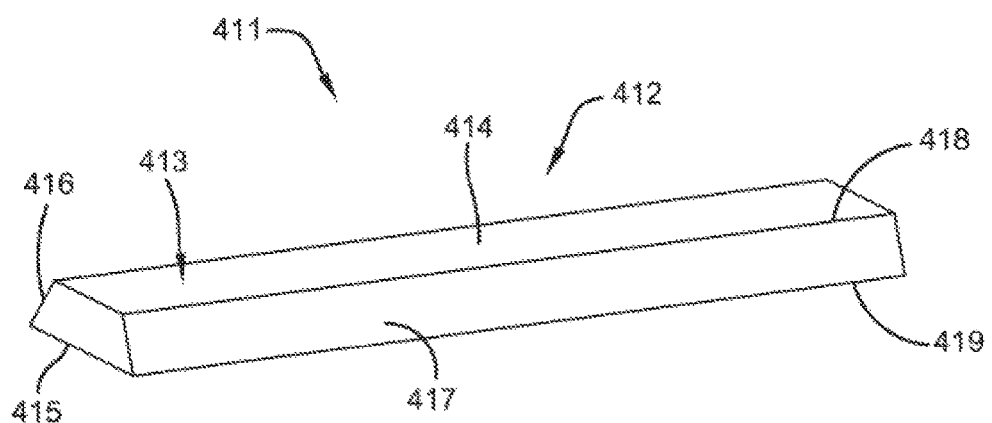
FIG. 11 is a side perspective view of an embodiment of a scoring tool of the present invention.

One embodiment of a scoring tool according to the present invention can be understood with reference to FIG. 11. Tool 411 comprises a release-member contacting element 412. Release-member contacting element 412, which may also be referred to as liner-contacting member 412, includes a generally trapezoidal shaped body 413 having a flat top portion 414, a flat bottom portion 415, a flat side portion 416, and a beveled side portion 417. The beveled side portion 417 contains a first edge 418 connected to the top portion 414 and a second edge 419 connected to the bottom portion 415. Although the second edge 419 is shown in FIG. 11 as being a straight edge, it is also contemplated that the second edge 419 could be a serrated edge.

Installation of Composite Membranes Using the Scoring Tool

The membrane composites of the present invention can advantageously be applied to a roof surface (also known as roof substrate) by using standard peel-and-stick techniques. For example, the membrane can be unrolled on a roof surface and placed into position. Portions of the membrane are then typically folded back and portions of the release member are removed. The membrane can then subsequently be adhered to the roof surface by using various techniques including the use of rollers and the like to mate the adhesive to the substrate. Either before or after securing the membrane to the roof surface, adjacent membrane panels are joined through a seaming process. In the case of thermoplastic membranes, the seaming process may include heat welding adjacent seams. Where thermoset membranes are employed, either liquid adhesives or tapes can be used to form an overlapping seam.

Prior to heat seaming in the case of thermoplastic membrane or application of a liquid or solids-based adhesive tape in the case of a thermoset membrane, it may be necessary to remove factory-applied adhesive in the lap region. In order to do so, according to embodiments of the present invention, the release liner is scored along a line perpendicular to the lap edge at a distance from the lap edge that creates a lap area or region. For example, as shown in FIG. 7A, composite 250 includes a first planar surface 252, first lateral edge 254, and second lateral edge 256, with each lateral edge extending longitudinally. Composite 250 further includes first longitudinal edge 258 and second longitudinal edge 260, with each longitudinal edge extending laterally between first lateral edge 254 and second lateral edge 256. As also shown in FIG. 7A, cut/score line 262 defines a lap area region 264 between first lateral edge 254 and cut/score line 262. Cut/score line 262, as shown, extends longitudinally parallel to first lateral edge 254. The skilled person will appreciate that a similar cut/score line can be formed laterally along first or second longitudinal edges 258, 260.

Figure 12:
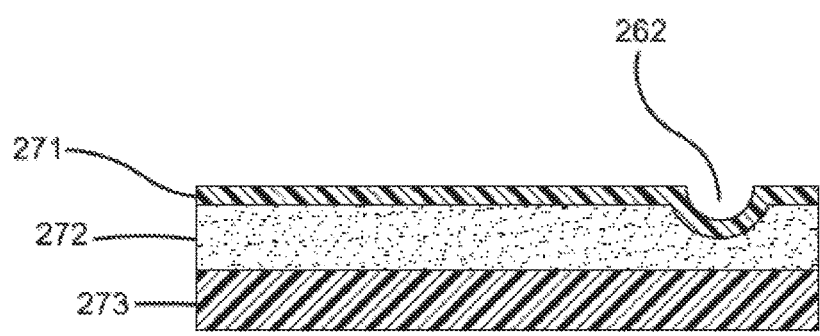
FIG. 12 is a cross-sectional side view of a roofing composite of FIG. 7A showing a depression made by the scoring tool of FIG. 11.

According to aspects of the present invention, the scoring tool 411 advantageously scores release liner 271 while simultaneously scoring the factory-applied adhesive layer 272 without cutting membrane layer 273 of composite 250. As best shown in FIG. 12, scoring tool 411 of the present invention creates the cut/score line 262, which serves to score release member 271, and at least partially score adhesive layer 272, while maintaining the integrity of membrane layer 273. Once the release member 271 and the factory-applied adhesive 271 have been scored, release member 271 is removed in the lap region area 260, as best shown in FIG. 8. The method of using scoring tool 411 to score release member 271 and the factory-applied adhesive 271 will now be discussed below.

Figure 13:
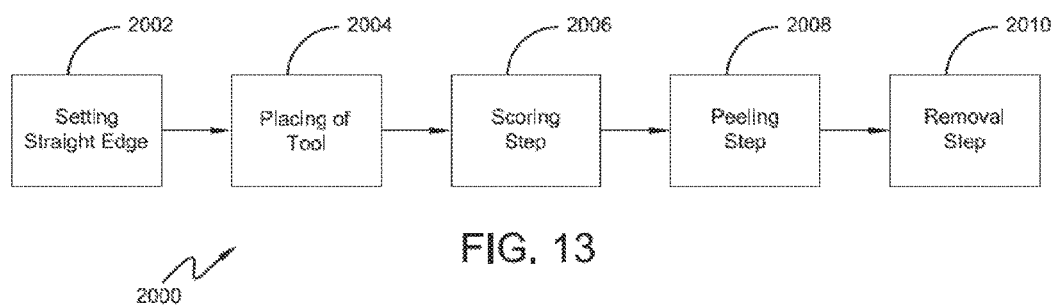
FIG. 13 is a flow chart describing a process for using the scoring tool of the present invention to remove pressure-sensitive adhesive along a lap edge of a roofing composite.
Figure 14:
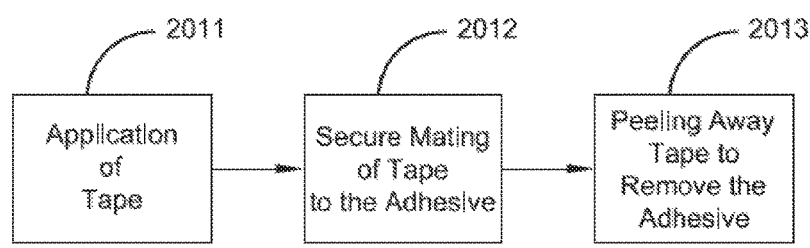
FIG. 14 is a flow chart describing sub-steps of the removal steps shown in FIG. 9.

As generally shown in FIG. 13, a process 2000 for removing the pressure-sensitive adhesive along the lap edge of a membrane according to the present invention generally begins with a step of setting a straight edge 2002, wherein a straight edge or a line is marked where a clean edge along the lap edge of the membrane is desired. Following the setting of a cut/score line along the straight edge, the second edge 419 of the beveled side 417 of scoring tool 411 is placed during a placing step 2004 along the line or straight edge formed in step 2002. In practice, this can include placement of the flat bottom side 415 on the first planar surface 252 of the membrane in the area not associated with the lap region area 260.

Following the placing of scoring tool 411, scoring of the release liner and adhesive layer is achieved during a scoring step 2006. In practice, the user of tool 411 can angle tool 411 such that the second edge 419 of the beveled side 417 is placed flush along the line or straight edge formed in step 2002. Once the second edge 419 of the beveled side 417 is in place along the line or straight edge, the user of the tool 411 can exert force on the second edge 419 into the composite 250, which will create a depression in (i.e. score) the release member 271 and the factory-applied adhesive 271 as shown in FIG. 12.

Following the scoring step 2006, the release member is removed in the lap region area 260 within cutting/tearing step 2008. Scoring tool 411 can facilitate this removal. For example, in one or more embodiments, scoring tool 411 is positioned so that second edge 419 of the beveled side 417 is positioned proximate to or on cut/score line 262. The installer can secure scoring tool 411 in place by exerting pressure with a first hand and then, using a second hand, peel away release member 271 from factory-applied adhesive layer 272. In so doing, release member 271 will tear along cut/score line 262 where release member 271 contacts scoring tool 411. In order to facilitate and ensure proper tearing along the desired cut/score line, tool 411 can be angled so that second edge 419 depresses against release member 271.

Pressure-sensitive adhesive 272 is removed during removal step 2010, which may be the same as removal step 1010 as described above.

Practice of the present invention is not necessarily limited by the selection of a high-tensile member. In particular embodiments, a high-tensile fabric is employed. In these or other embodiments, the high-tensile fabric carries an adhesive layer; in other words, a pressure-sensitive adhesive tape including a fabric backing may be employed. In one or more embodiments, the high-tensile member includes duct tape. Once the high-tensile member has been adhesively mated to the factory-applied adhesive 272 within the lap region 260, the high-tensile member is forcibly removed, which results in removal of the factory-applied adhesive 272 within the lap region 260. Advantageously, the presence of the score line within the factory-applied adhesive layer 272 results in the substantial removal of the factory-applied adhesive 272 only in the lap region 260. Once the factory-applied adhesive 272 has been removed within the lap region 260, seaming of adjacent membranes can take place. As suggested above, where the membranes are thermoplastic membranes, adjacent membranes can be heat welded. Alternatively, where the membranes are thermoset membranes, adjacent membranes can be seamed by use of an adhesive, such as a liquid adhesive or a tape adhesive.

Various modifications and alterations that do not depart from the scope and spirit of this invention will become apparent to those skilled in the art. This invention is not to be duly limited to the illustrative embodiments set forth herein.

What is claimed is:

1. A method of installing a roofing composite membrane, the method comprising:
   (i) providing a membrane composite including a polymeric planar body having first and second opposed planar surfaces and a lap edge, a pressure-sensitive adhesive layer disposed on the first planar surface, and a release member removably affixed to the adhesive layer;
   (ii) cutting the release liner while simultaneously scoring the adhesive layer along a line substantially parallel to the lap edge with a cutting and scoring tool, wherein scoring creates a score line in the adhesive layer so as to define a lap area on the first planar surface, where said cutting and scoring tool comprises a cutting element and a liner-contacting member which contacts the release liner;
   (iii) removing the release member to expose the adhesive layer in the lap area;
   (iv) applying a high-tensile member to the adhesive layer in the lap area;
   (v) forcibly removing the high-tensile member to thereby remove the adhesive layer within the lap area; and
   (vi) seaming the membrane composite to an adjacent membrane.

2. The method of claim 1, where prior to step (ii) a straight edge or a line is marked at the desired position where the release liner is to be scored.

3. The method of claim 1, the method further comprising:
   (vii) adhesively securing said membrane composite to a roof surface.

4. The method of claim 3, the method further comprising:
   (viii) providing a second membrane composite including a polymeric planar body having first and second planar surfaces, a pressure-sensitive adhesive layer disposed on the first planar surface thereof, and a release member removably affixed to the adhesive layer.

5. The method of claim 3, wherein said steps (iv) and (v) comprise:
   (i) said step of applying a high-tensile member to the adhesive involves applying a layer of industrial strength tape over the exposed adhesive layer;
   (ii) using the cutting and scoring tool to securely mate the tape to the exposed adhesive layer; and
   (iii) said step of forcibly removing the high tensile member involves peeling away the tape so as to remove the exposed adhesive layer from the lap edge of the membrane.

6. The method of claim 1, wherein the cutting and scoring tool further comprises a handle and wherein the liner-contacting member is attached to the handle by a connection arm.

7. The method of claim 1, wherein the liner-contacting member is a roller wheel having an axle.

8. The method of claim 7, wherein the cutting element is a solid disc blade that is attached to an outside edge of the liner-contacting member.

9. The method of claim 7, wherein the cutting element is a solid straight razor blade that is attached to the axle of the liner-contacting member.

10. The method of claim 7, wherein the cutting element is a serrated disc blade that is attached to an outside edge of the liner-containing member.

11. The method of claim 1, wherein the liner-contacting member is a sled.

12. The method of claim 11, wherein the cutting tool is a solid straight razor blade that is attached to an outside edge of the liner-contacting member.

* * * * *